(12) United States Patent
Hosokawa

(10) Patent No.: US 7,159,874 B2
(45) Date of Patent: Jan. 9, 2007

(54) SEALING CONSTRUCTION

(75) Inventor: Atsushi Hosokawa, Arida (JP)

(73) Assignee: Mitsubishi Cable Industies, Ltd., Itami (JP)

( * ) Notice: Subject to any disclaimer, the term of this patent is extended or adjusted under 35 U.S.C. 154(b) by 48 days.

(21) Appl. No.: 11/148,311

(22) Filed: Jun. 9, 2005

(65) Prior Publication Data
US 2005/0285354 A1    Dec. 29, 2005

(30) Foreign Application Priority Data
Jun. 15, 2004    (JP)    ............... 2004-176747

(51) Int. Cl.
*F16J 15/10*    (2006.01)
(52) U.S. Cl. ............ 277/651; 277/641; 277/642; 277/643; 277/649; 277/638
(58) Field of Classification Search ............ 277/638, 277/640–643, 651, 619, 611, 639, 649
See application file for complete search history.

(56) References Cited

U.S. PATENT DOCUMENTS

| | | | | |
|---|---|---|---|---|
| 2,687,909 A | * | 8/1954 | Blackman et al. ......... | 277/651 |
| 2,722,043 A | * | 11/1955 | Nenzell ................. | 49/479.1 |
| 3,490,776 A | * | 1/1970 | Avery .................. | 277/649 |
| 4,468,042 A | * | 8/1984 | Pippert et al. ........... | 277/638 |
| 5,513,603 A | * | 5/1996 | Ang et al. .............. | 123/90.37 |
| 5,851,387 A | * | 12/1998 | Neumann ................ | 210/229 |
| 6,039,323 A | * | 3/2000 | Mockenhaupt et al. ..... | 277/593 |
| 6,591,801 B1 | * | 7/2003 | Fonville ................ | 123/90.38 |
| 7,048,279 B1 | * | 5/2006 | Gernand et al. .......... | 277/596 |

FOREIGN PATENT DOCUMENTS

JP    2779946    10/1990

* cited by examiner

*Primary Examiner*—Alison K. Pickard
(74) *Attorney, Agent, or Firm*—Armstrong, Kratz, Quintos, Hanson & Brooks, LLP

(57) ABSTRACT

A sealing construction provided with a plate member of metal and a rubber member forming a sealing portion and unitedly fixed to the plate member on which a ring concave groove is formed on an obverse face. And, plural through holes, having enlarged opening end portions on a reverse face, are formed through a bottom face of the ring concave groove and the reverse face. Further, a ring plate is disposed as to contact the bottom face of the ring concave groove and partially close the opening portions of the through holes toward the bottom face, and the rubber member, fit to the through hole and surrounding the ring plate, is unitedly connected to the sealing portion in the ring concave groove.

6 Claims, 9 Drawing Sheets

SEALING CONSTRUCTION

BACKGROUND OF THE INVENTION

1. Field of the Invention

This invention relates to a sealing construction used for sealing fluid (vacuum), especially, a sealing construction used for chamber gate portion of a manufacturing apparatus for semiconductors or a surface-processing apparatus for liquid crystal panels.

2. Description of the Related Art

As conventional sealing constructions used for a manufacturing apparatus for semiconductors or a surface-processing apparatus for liquid crystal panels, an O-ring 41 attached to a circular dovetail groove 42 shown in FIG. 9A and a three-leg elastic seal 43 fixed by adhesive to a circular concave groove 44 formed on a metal member 45 shown in FIG. 9B.

However, the O-ring 41 shown in FIG. 9A, having an unstable posture in the dovetail groove 42, may fall out of the dovetail groove 42 and may not show sufficient sealability. And, the elastic seal 43 shown in FIG. 9B requires fixing process with adhesive, and the metal member 45 is difficult to be reused by peeling the elastic seal 43 off the metal member 45 when the elastic seal 43 deteriorates.

To solve the problems above, in a conventional seal construction shown in FIG. 9C, a circular concave groove 44 is formed on an obverse face 46 of a metal member 45, a through hole 49 having an enlarged portion 48 on a reverse face 47 goes through a bottom face of the circular concave groove 44 and the reverse face 47, and a rubber member 50 is unitedly fixed to the through hole 49 and forming a sealing portion 51 in the circular concave groove 44 (refer to Japanese Patent No. 2779946, for example). With this sealing construction, the sealing portion 51 can be kept stable in the circular concave groove 44 without adhesive, and the metal member 45 is reusable.

However, in the conventional seal construction shown in FIG. 9C, a dimple (recess) Z is generated on a surface, corresponding to the part on which the through hole 49 of the sealing portion 51 is disposed, by rubber contraction in cooling process after forming of the rubber member 50, and sealability is spoiled thereby. High pressing force (compression force) does not work on the sealing portion 51 because closing of doors (lids) of a gas storing chamber (a vacuum chamber) of a manufacturing apparatus for semiconductors or a surface-processing apparatus for liquid crystal panels is generally conducted with minimum required pressing force. Therefore, the reduction of sealability by the dimple (recess) is not eliminated.

It is therefore an object of the present invention to provide a sealing construction in which the dimple (recess) is not generated on the part relating to sealability.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
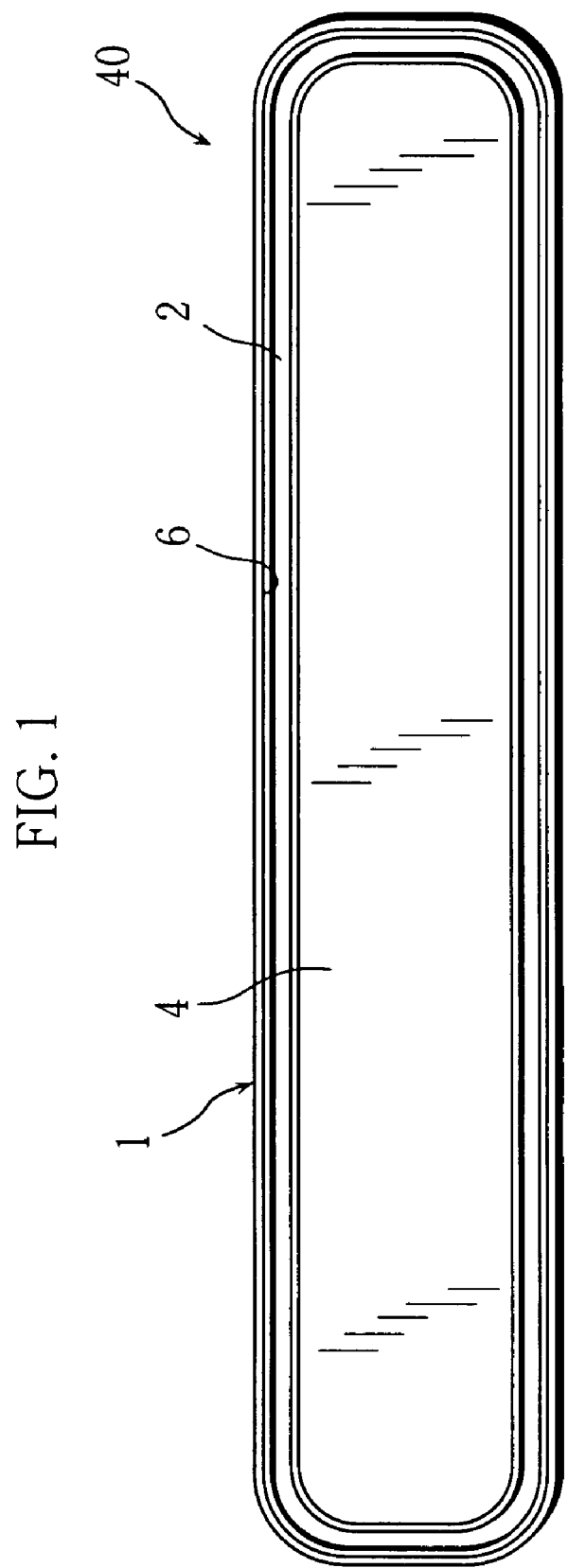
FIG. 1 is a top view showing a first embodiment of the present invention.
Figure 2:
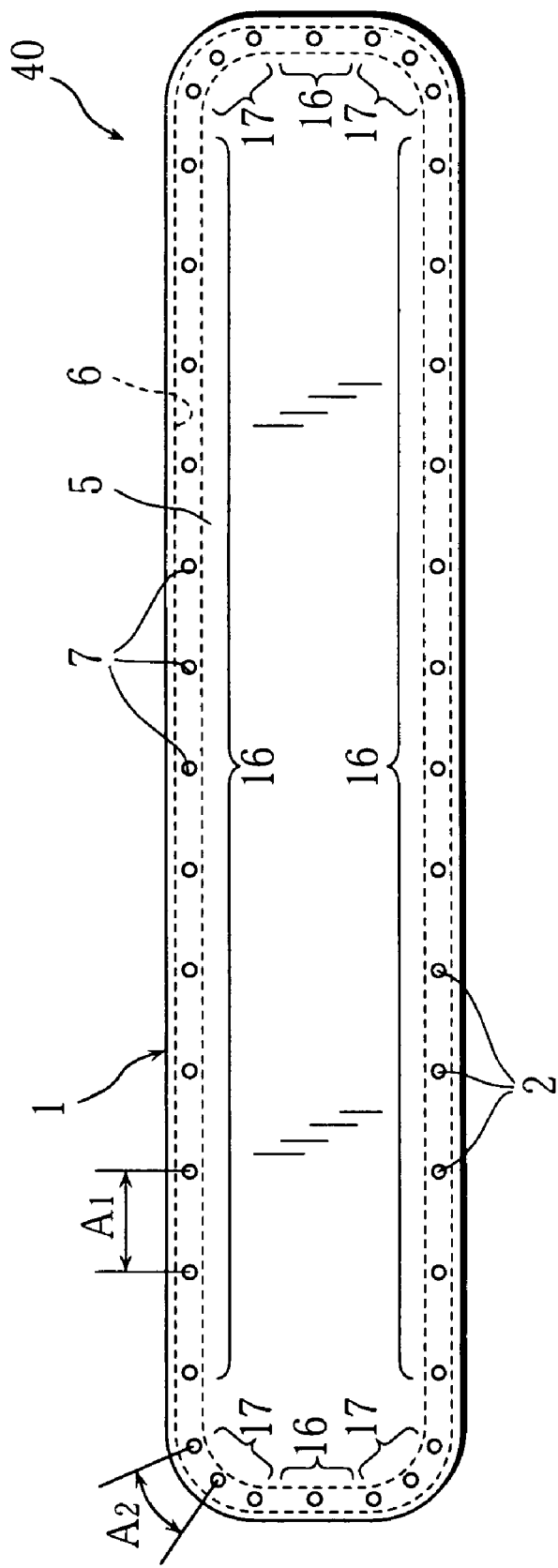
FIG. 2 is a bottom view.
Figure 3:
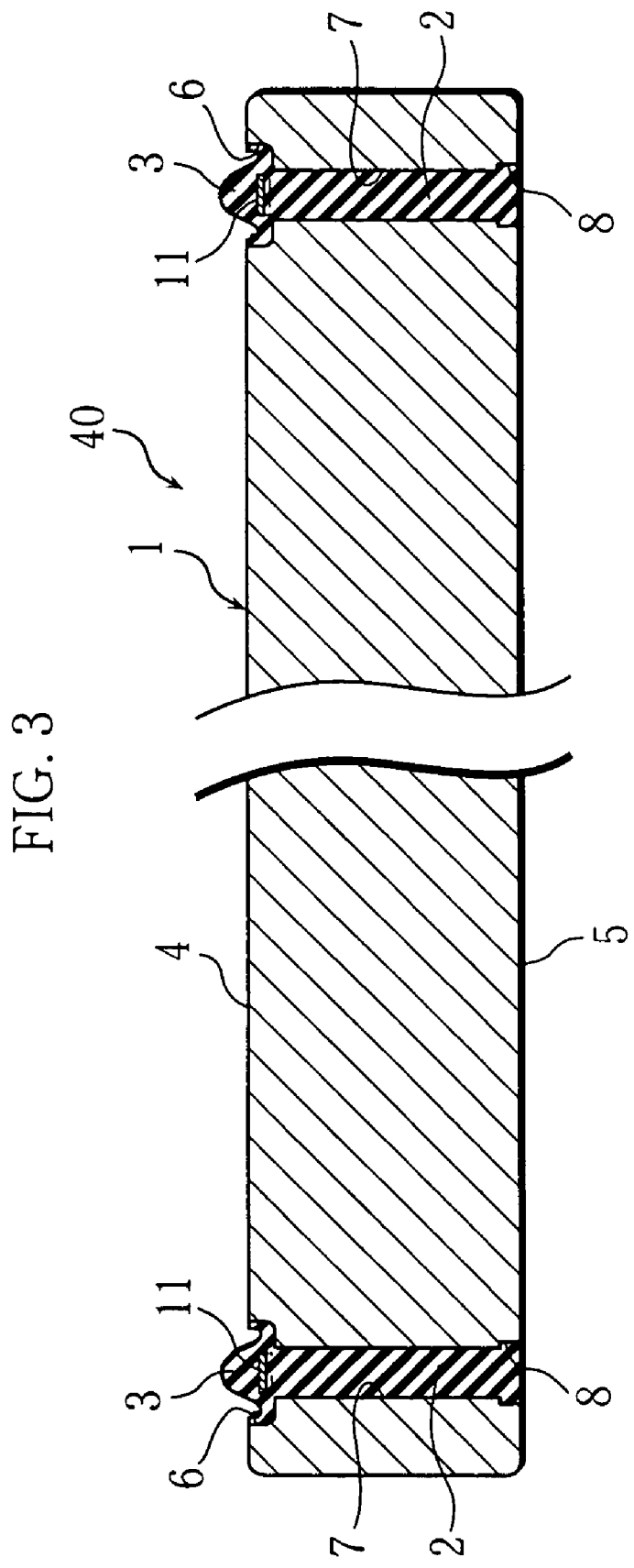
FIG. 3 is a cross-sectional side view showing an uncompressed state.
Figure 4:
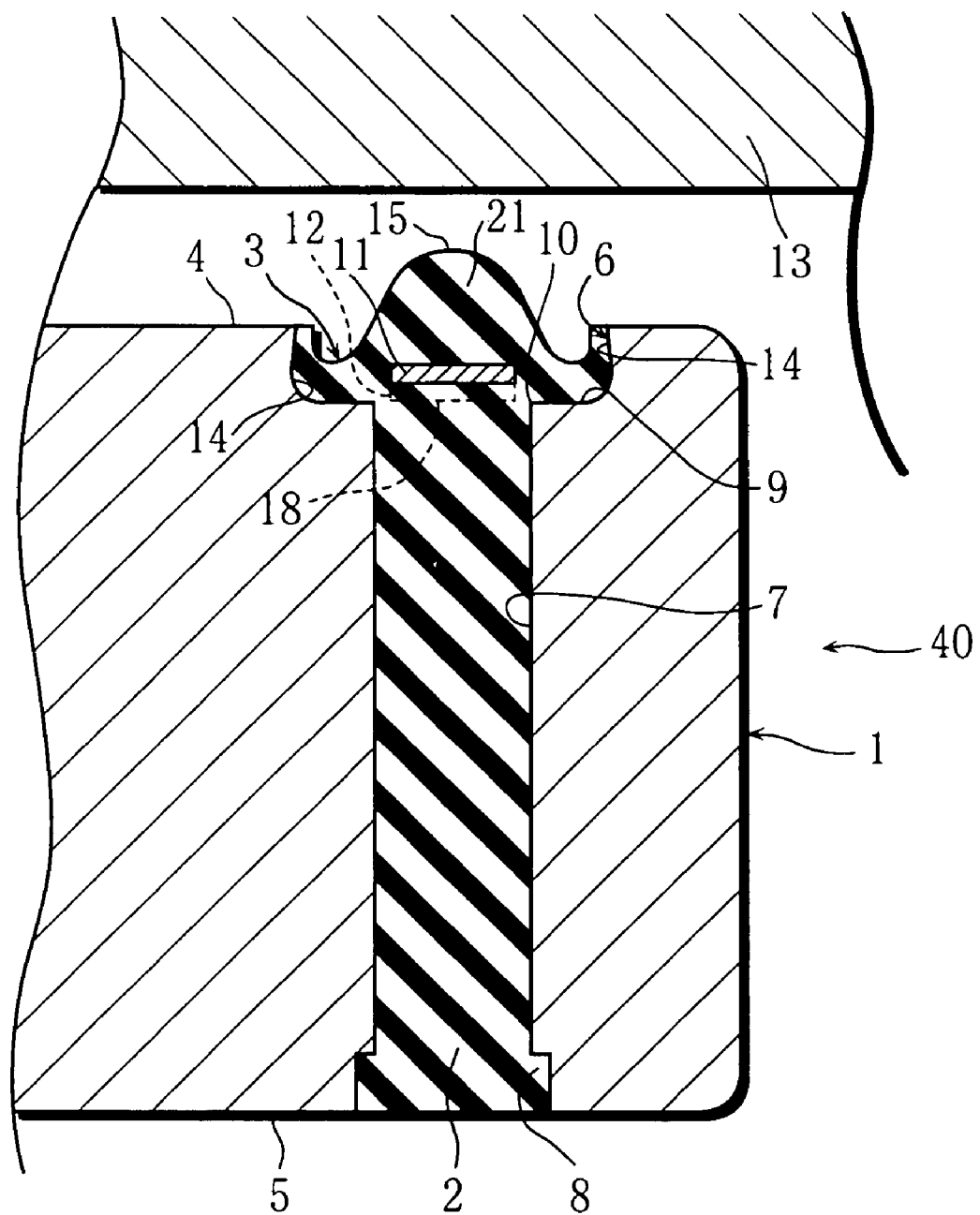
FIG. 4 is an enlarged cross-sectional view of a principal portion showing the uncompressed state.
Figure 5:
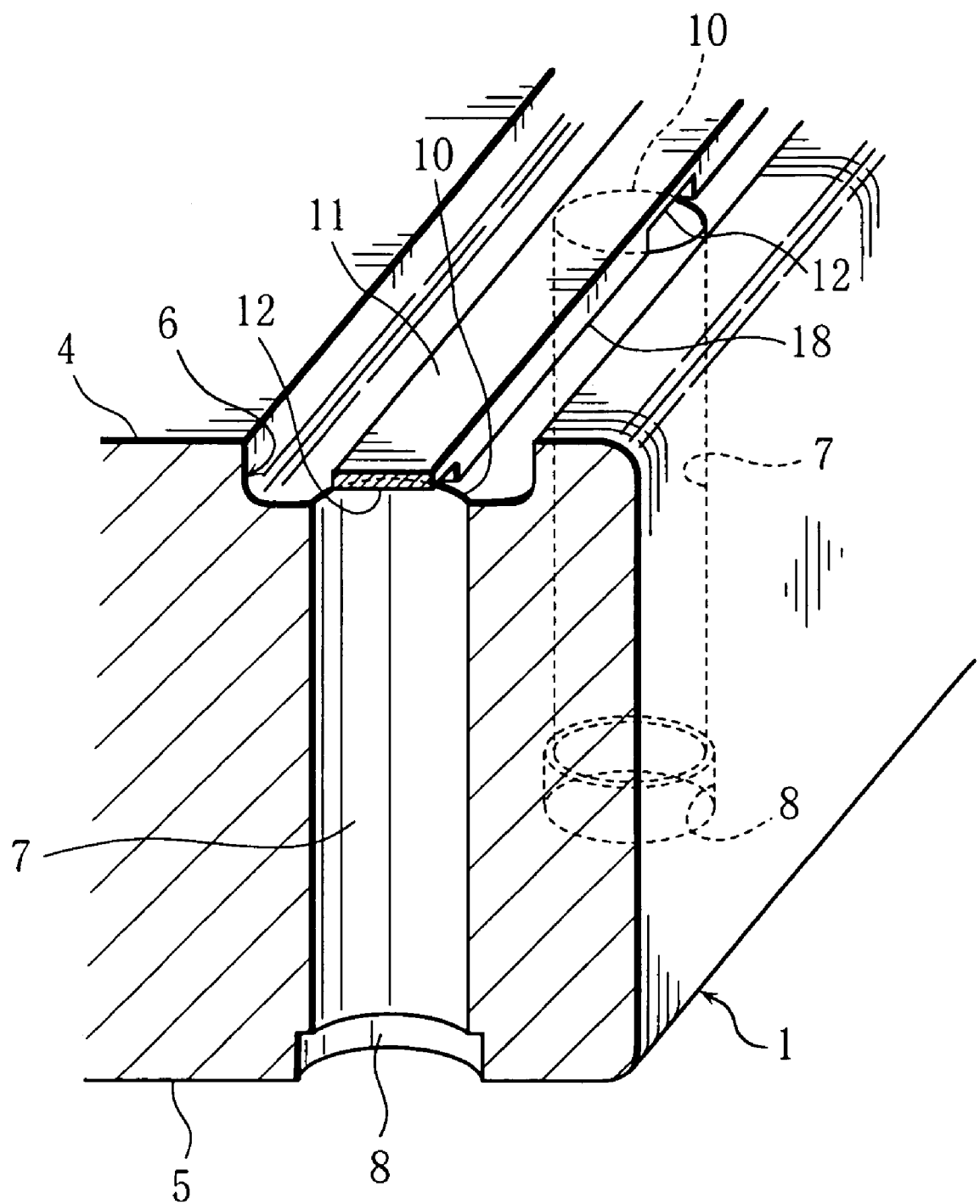
FIG. 5 is an explanatory cross-sectional perspective view.
Figure 6:
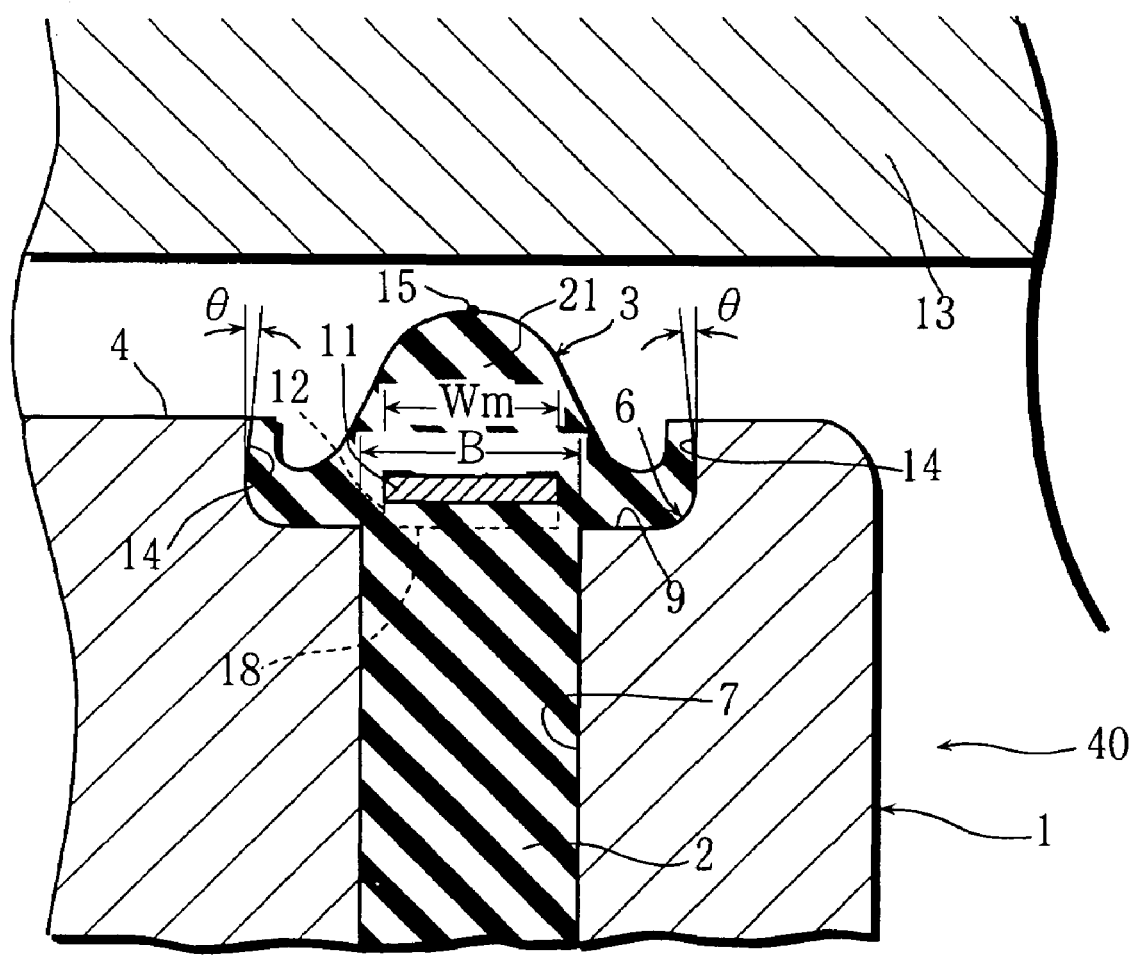
FIG. 6 is an enlarged cross-sectional view of a principal portion showing the uncompressed state.
Figure 7:
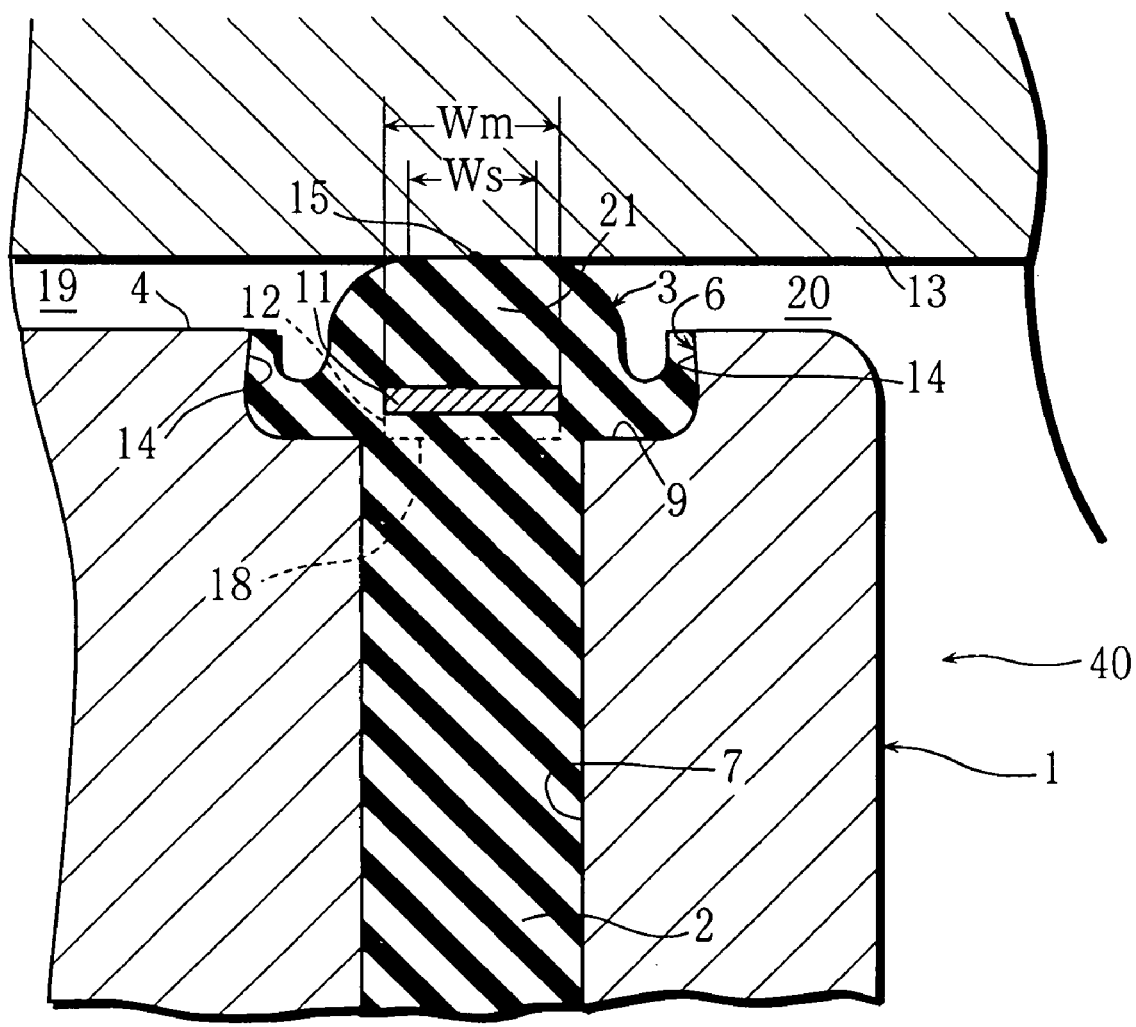
FIG. 7 is an enlarged cross-sectional view of a principal portion showing a compressed operational state.

In a first embodiment shown in FIGS. 1 through 7, a mark 40 represents a sealing construction composed of a plate member 1 of metal, a rubber member 2 unitedly fixed to the plate member 1, and a ring plate 11. The plate member 1 is approximately rectangle of which corners are rounded in a top view, and a ring concave groove 6 is formed on an obverse face 4 of the plate member 1. The rubber member 2 has a sealing portion 3. A mark 13 represents a corresponding member relatively comes close to the obverse face 4 of the plate member 1. FIGS. 3, 4, and 6 show a state in which the sealing portion 3 is not receiving compression load from the corresponding member 13, namely, an uncompressed state, and FIG. 7 shows a state in which the sealing portion 3 is receiving compression load from the corresponding member 13, namely, a compressed operational state. And, in FIG. 7, a mark 19 shows vacuum atmosphere or corrosive gas space (in a chamber gate) in which corrosive gas such as plasmatic gas exists, and a mark 20 shows an atmosphere space.

Plural through holes 7 are formed from a bottom face 9 of the ring concave groove 6 to a reverse face 5 of the plate member 1, and the through hole 7 has an enlarged opening end portion 8 formed as to increase in diameter on the reverse face 5 side for stopping. The through hole 7 and the enlarged opening end portion 8, formed circular in lateral cross section, may have other configurations. And, the through hole 7 has an opening portion 10 to the bottom face 9.

And, the sealing portion 3 has three branched protrusions toward the corresponding member 13 in cross section, and the central protrusion is a sealing lip 21 tightly fit to the corresponding member 13. As shown in FIG. 5, the ring plate 11 is disposed in the ring concave groove 6 as to contact the bottom face 9 and partially close the opening portion 10, then, the sealing construction is set in a mold not shown in Figures, rubber material is injected from the enlarged opening end portion 8 into the through hole 7 and a cavity (for forming the sealing portion 3) is filled with the rubber to form the sealing portion 3. Then, the rubber member 2 is vulcanized by heating. As described above, the rubber member 2 forms the sealing portion 3 in the ring concave groove 6 and surrounds the ring plate 11. Concretely, the ring plate 11 is disposed to partially close a position of the opening portion 10 corresponding to a central portion 15 of the sealing lip as an apex of the sealing lip 21.

Further, in the compressed operational state shown in FIG. 7, a width dimension Wm of the ring plate 11 is set to be larger than a sealing lip width dimension Ws on which the sealing lip 21 tightly fits to the corresponding member 13.

And, a notched portion 12 is formed in a width direction of the ring plate 11 on a contact face 18 of the ring plate 11 corresponding to the bottom face 9 of the ring concave groove 6 as to facing the opening portion 10. Further, the width dimension Wm of the ring plate 11 is set to be smaller than a width dimension B of the opening portion 10 (refer to FIG. 6).

As shown in FIG. 1 and FIG. 2, the ring concave groove 6 is formed into an approximately rectangle ring having rounded corners in top view, and provided with straight portions 16 and curved portions 17. Further, interval $A_1$ between the through holes 7 disposed on the straight portion 16 is set to be larger than interval $A_2$ between the through holes 7 disposed on the curved portion 17. To describe concretely, the through holes 7 on the curved portion 17 must be disposed with intervals necessary to maintain strength of the sealing portion 3 because the sealing portion 3 of the rubber member 2, tightly fit to the corresponding member 13, may be pulled out of the ring concave groove 6 and peeled off the rubber member 2 by the corresponding member 13 when the corresponding member 13 relatively parts from the plate member 1 (the compressed operational state is changed to the uncompressed state), and this tends to occur on the curved portion 17 more frequently than on the straight portion 16 of the ring concave groove 6. On the contrary, the through holes 7 on the straight portion 16, unnecessary to be disposed with intervals similar to that of the through holes 7 on the curved portion 17, are minimum in number (the interval $A_1$ is set to be larger than the interval $A_2$) to make the rubber member 2 easier to remove from the plate member 1 when the plate member 1 is reused. The configuration of the ring concave groove 6 in top view may be circular, oval, and other configurations.

Both side walls 14 of the ring concave groove 6 are inclined as to relatively come close toward the corresponding member 13 to prevent the sealing portion 3 from being peeled off when the corresponding member 13 relatively parts from the plate member 1 (the compressed operational state is changed to the uncompressed state), and inclination angle θ of the side walls 14 is respectively set to be $0°<θ≦10°$, preferably $1°≦θ≦10°$ (refer to FIG. 6). When the inclination angle θ is less than 0°, the sealing portion 3 can not be prevented from being pulled by the corresponding member 13 and peeled off, and the ring concave groove 6 becomes difficult to make when the inclination angle θ is more than 10°.

The plate member 1, formed with aluminum, aluminum alloy, stainless steel (SUS), steel (carbon steel, special steel), etc., is preferably formed with aluminum or aluminum alloy for its light weight. And, when aluminum or aluminum alloy is used as the material of the plate member 1, it is especially preferable to treat the surface of the plate member 1 with alumite. With this treatment, corrosion (deterioration) of the plate member 1 by corrosive gas is prevented. And, it is also preferable to conduct surface treatment to prevent corrosion when other materials are used.

The rubber member 2 is made of silicone rubber or fluororubber. The material is chosen according to treatment conducted in the manufacturing apparatus for semiconductor and maintenance of sealability. For example, when the sealing construction 40 is used (to conduct etching) under circumstances in which plus and minus ionized atoms exist, the rubber member 2 is preferably made of silicone rubber, and the rubber member 2 is preferably made of fluororubber when the sealing construction 40 is used (to conduct etching) under electrically neutral circumstances or used on a point distant from where etching is conducted. Especially, when the sealing construction 40 is used under circumstances of oxygen plasma treatment (oxygen radical state), the rubber member 2 is preferably made of material (A) or (B) described below excellent in durability against oxygen plasma.

(A) a polyol-vulcanized compound of vinylidene fluoride-propylene hexafluoride copolymer and/or vinylidene fluoride-propylene hexafluoride-ethylene tetrafluoride copolymer of 100 units in weight, and barium sulfate of 20 to 100 units in weight (B) a compound of vinylidene fluoride-propylene hexafluoride copolymer and/or vinylidene fluoride-propylene hexafluoride-ethylene tetrafluoride copolymer of 100 units in weight, and ethylene tetrafluoride resin of 0.5 to 30 units in weight.

Figure 8:
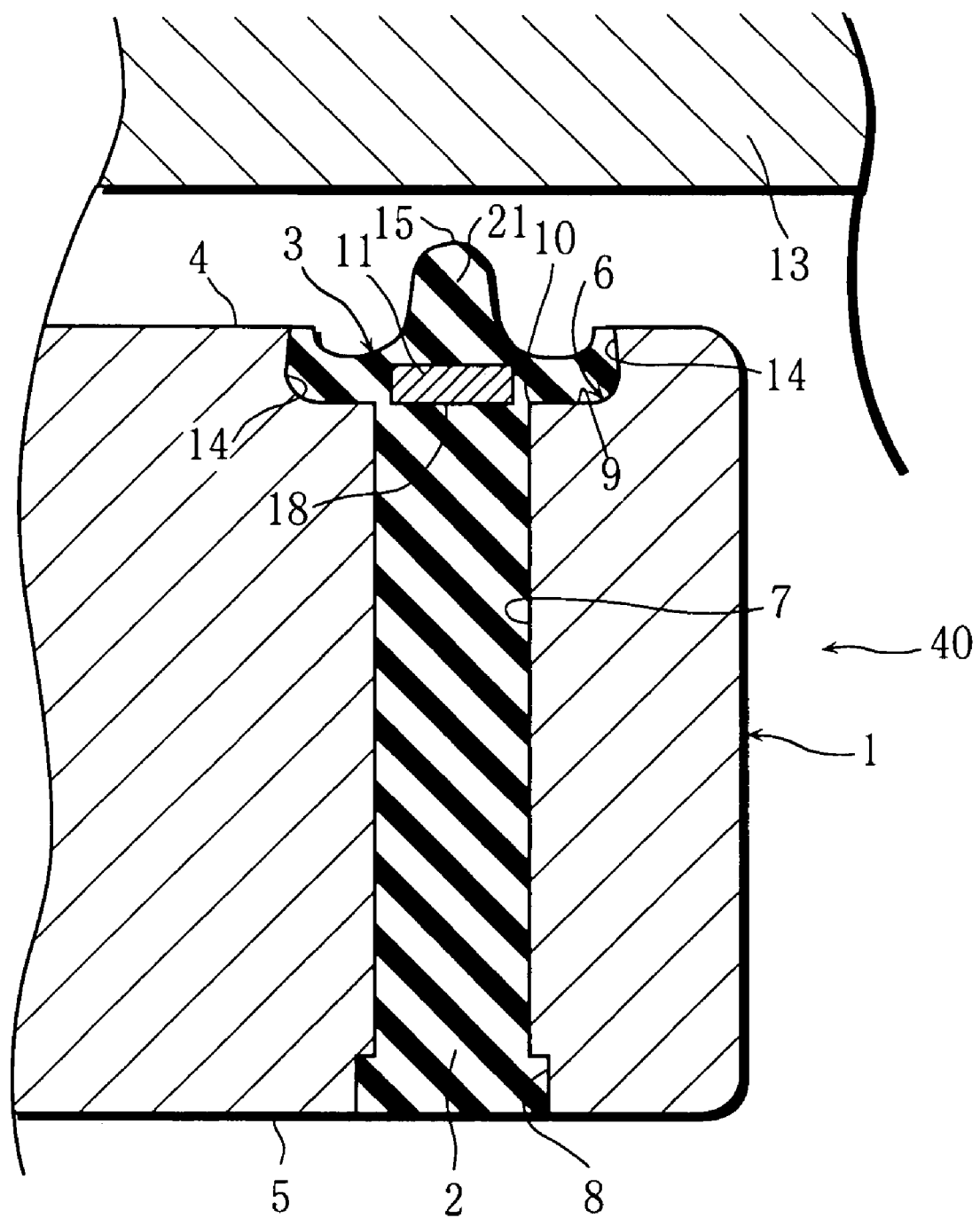
FIG. 8 is an enlarged cross-sectional view of a principal portion in an uncompressed state showing a second embodiment.
Figure 9A:
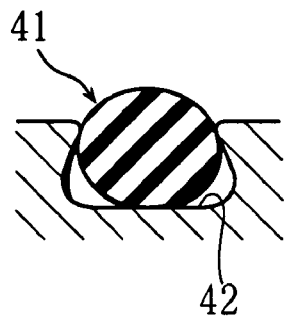
FIG. 9A is a cross-sectional view showing a conventional sealing construction.
Figure 9B:
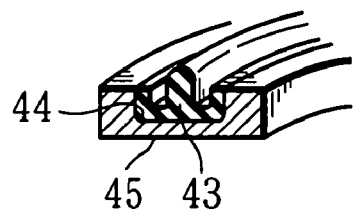
FIG. 9B is a cross-sectional view showing a conventional sealing construction.
Figure 9C:
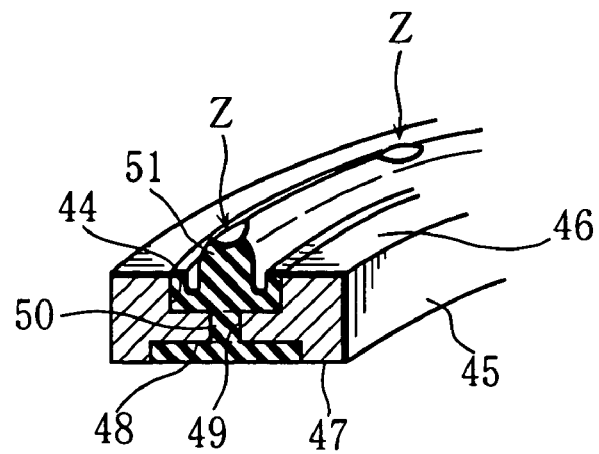
FIG. 9C is a cross-sectional view showing a conventional sealing construction.

In a second embodiment shown in FIG. 8, the sealing construction is in the uncompressed state, and the notched portion 12 is not formed in the ring plate 11. To prevent the sealing portion 3 from being peeled off when the corresponding member 13 relatively parts from the plate member 1 (the compressed operational state is changed to the uncompressed state), the sealing lip 21 is formed thin, and sealing lip width dimension Ws to tightly fit the corresponding member 13 in the compressed operational state is set to be smaller than the sealing lip width dimension Ws in the first embodiment. In FIG. 8, explanation of members of the same marks as in FIG. 4 is omitted because these members are similarly constructed as in FIG. 4.

In the present invention, freely changeable in design other than the embodiments described above, two sealing lips 21 may be formed as the sealing portion 3, two ring plate 11 may be provided as to partially close the positions of the opening portions 10 corresponding to the central portions 15 as the apexes of the sealing lips 21 respectively. And, one ring plate 11 may partially close the positions of the opening portions 10 corresponding to the two central portions 15. Further, when one ring plate 11 is used, a hole may be formed from the bottom face portion of the notched portion 12 to a face opposite to the contact face 18 of the ring plate 11, and filled with the rubber member 2 to connect with the sealing portion 3 to enhance the strength of the sealing portion 3.

Next, operation method (function) of the sealing construction 40 of the present invention described above is explained.

First, as shown in FIG. 6, the sealing construction 40 is in the uncompressed state. Then, the corresponding member 13 relatively comes close to the plate member 1 to compress the sealing portion 3 of the rubber member 2 into the compressed operational state. Air in the atmosphere space 20 is prevented from intruding to the space (in the chamber) 19 where the treatment is conducted, the vacuum circumstance in the space (in the chamber) 19 where the treatment is conducted is kept, and (to keep the sealability) the corrosive gas is prevented from leaking to the atmosphere (the atmosphere space 20). When the corresponding member 13 relatively parts from the plate member 1, the sealing portion is returned from the compressed operational state to the uncompressed state. In this case, when the corresponding member 13 relatively parts from the plate member 1 while the sealing portion 3 is tightly fit to the corresponding member 13, the both side walls 14 of the ring concave groove 6 restrict the sealing portion 3 as not to be pulled by the corresponding member 13.

As described above, the dimple (recess) Z is not generated on the part of the sealing lip 21 relating to sealability (the part where the sealing portion 3 tightly fits to the corresponding member 13 in the compressed operational state), and high sealability is achieved because in the sealing construction of the present invention, provided with the plate member 1 of metal and the rubber member 2 forming the sealing portion 3 and unitedly fixed to the plate member 1, the ring concave groove 6 is formed on the obverse face 4 of the plate member 1, the plural through holes 7, each of which has the enlarged opening end portion 8 on the reverse side 5, are formed from the bottom face 9 of the ring concave groove 6 to the reverse face 5, the ring plate 11 is disposed as to contact the bottom face 9 of the ring concave groove 6 and partially close the opening portion 10 on the bottom face 9 of the through hole 7, and the rubber member 2 is filled into the through hole 7, surrounding the ring plate 11, and unitedly connected with the sealing portion 3 in the ring concave groove 6.

The dimple (recess) Z is not generated on the part of the sealing lip 21 relating to sealability (the part where the sealing portion 3 tightly fits to the corresponding member 13 in the compressed operational state), and high sealability is achieved also because the ring plate 11 is disposed as to partially close the opening portion 10 of the through hole 7 on the position corresponding at least to the sealing lip central portion 15 of the sealing portion 3.

The rubber member 2 is firmly and unitedly connected with the sealing portion 3, and the sealing portion 3 is not peeled off by pulling of the corresponding member 13 because the notched portion 12 facing the opening portion 10 is formed on the contact face 18 side corresponding to the bottom face 9 of the ring concave groove 6 in the width direction of the ring plate 11, and the width dimension Wm of the ring plate 11 is set to be smaller than the width dimension B of the opening portion 10. And, the sealing portion 3 is not broken when receiving the compression load from the corresponding member 13.

The side walls 14 of the ring concave groove 6 prevent the sealing portion 3 from being pulled by the corresponding member 13 when the corresponding member 13 relatively parts from the plate member 1 while the sealing portion 3 is tightly fitting to the corresponding member 13 because the both side walls 14 of the ring concave groove 6 incline as to come close each other toward the corresponding member 13 which relatively comes close to the plate member 1, and inclination angle θ of each of the side walls 14 is respectively set to be $0° < θ \leq 10°$ (preferably $1° \leq θ \leq 10°$). The sealing portion 3 is prevented from being pulled by the corresponding member 13 and peeled off the rubber member 2 thereby.

The dimple (recess) Z is not generated on the part of the sealing lip 21 relating to sealability (the part where the sealing portion 3 tightly fits to the corresponding member 13 in the compressed operational state), and high sealability is achieved because the width dimension Wm of the ring plate 6 is set to be larger than the sealing lip width dimension Ws on which the sealing portion 3 tightly fits to the corresponding member 13 in the compressed operational state in which the corresponding member 13 relatively comes close to the plate member 1 and the sealing portion 3 receives compression load from the corresponding member 13.

And, the sealing portion 3 is prevented from being pulled out of the ring concave groove 6 and peeled off the rubber member 2 when the corresponding member 13 relatively parts from the plate member 1, and the rubber member 2 can be easily removed from the plate member 1 when the rubber member 2 deteriorates and needs change to reuse the plate member 1 because the ring concave groove 6 is provided with the straight portion 16 and the curved portion 17, and the interval $A_1$ between the through holes 7 disposed on the straight portion 16 is set to be larger than the interval $A_2$ between the through holes 7 disposed on the curved portion 17. Especially, this is effective for a large sealing construction.

While preferred embodiments of the present invention have been described in this specification, it is to be understood that the invention is illustrative and not restrictive, because various changes are possible within the spirit and indispensable features.

What is claimed is:

1. A sealing construction provided with a plate member of metal and a rubber member forming a sealing portion and unitedly fixed to the plate member, comprising a construction in which:
   a ring concave groove is formed on an obverse face of the plate member;
   plural through holes, each of which has an enlarged opening end portion on a reverse face side, are formed from a bottom face of the ring concave groove to the reverse face;
   a ring plate is disposed as to contact the bottom face of the ring concave groove and partially close an opening portion on the bottom face of the through hole; and
   the rubber member is filled into the through hole, surrounding the ring plate, and unitedly connected with the sealing portion in the ring concave groove.

2. The sealing material as set forth in claim 1, wherein the ring plate is disposed as to partially close the opening portion of the through hole on a position corresponding at least to a sealing lip central portion of the sealing portion.

3. The sealing material as set forth in claim 1 or claim 2, wherein a notched portion facing the opening portion is formed on a contact face side corresponding to the bottom face of the ring concave groove in a width direction of the ring plate, and a width dimension of the ring plate is set to be smaller than a width dimension of the opening portion.

4. The sealing material as set forth in claim 1 or claim 2, wherein both side walls of the ring concave groove incline as to come close each other toward a corresponding member which relatively comes close to the plate member, and inclination angle of each of the side walls is respectively set to be more than 0° and equal to or less than 10°.

5. The sealing material as set forth in claim 1 or claim 2, wherein a width dimension of the ring plate is set to be larger than a sealing lip width dimension on which the sealing portion tightly fits to a corresponding member in a compressed operational state in which the corresponding member relatively comes close to the plate member and the sealing portion receives compression load.

6. The sealing material as set forth in claim 1 or claim 2, wherein the ring concave groove is provided with a straight portion and a curved portion, and an interval between the through holes disposed on the straight portion is set to be larger than an interval between the through holes disposed on the curved portion.

* * * * *